United States Patent [19]

Carter, Jr.

[11] 4,423,754
[45] Jan. 3, 1984

[54] CUP TYPE PIPELINE INFLATION ANCHOR

[75] Inventor: Ernest E. Carter, Jr., Duncan, Okla.

[73] Assignee: Halliburton Company, Duncan, Okla.

[21] Appl. No.: 350,930

[22] Filed: Feb. 22, 1982

[51] Int. Cl.³ .............................................. F16L 55/12
[52] U.S. Cl. .................................................... 138/93
[58] Field of Search ...................... 138/90, 91, 93, 172, 138/89, 92, 109, 130; 166/202; 277/9.5, 212 C; 285/97, 107, 109, DIG. 16, 246, 247

[56] References Cited

U.S. PATENT DOCUMENTS

| | | | |
|---|---|---|---|
| 2,549,706 | 4/1951 | Page | 166/202 X |
| 2,674,315 | 4/1954 | Brown | 166/202 X |
| 2,920,910 | 1/1960 | Schnabel | 285/DIG. 16 X |
| 3,010,518 | 11/1961 | Harmon | 166/202 X |
| 3,353,565 | 11/1967 | Markham | 285/107 X |
| 3,417,673 | 12/1968 | Bowerman | 277/212 C X |
| 3,422,902 | 1/1969 | Bouchillon | 166/202 |
| 3,499,668 | 3/1970 | Cullen et al. | 138/134 X |
| 3,593,749 | 7/1971 | Reardon | 138/93 |
| 3,762,446 | 10/1973 | Tungseth et al. | 138/97 |
| 3,835,889 | 9/1974 | Hyde | 138/93 |
| 3,903,728 | 9/1975 | Matthews | 73/40.5 R |
| 3,978,678 | 9/1976 | Duncan et al. | 405/171 |
| 4,013,100 | 3/1977 | Thiery et al. | 138/172 X |
| 4,077,435 | 3/1978 | Van Scoy | 138/93 |
| 4,079,755 | 3/1978 | Van der Lans | 138/93 |

*Primary Examiner*—James E. Bryant, III
*Assistant Examiner*—Mark Thronson
*Attorney, Agent, or Firm*—Joseph A. Walkowski; Thomas R. Weaver

[57] ABSTRACT

An inflation anchor for sealing a conduit bore. A tubular elastomeric bladder is attached to a shoe assembly, with two layers of calendered steel cable being fixed to the shoe assembly and surrounding the bladder. At the free end of the bladder, an elastomeric cup is bonded thereto and overlaps the layers of cable. In operation, a valve is closed between the interior and exterior of the anchor, and fluid pressure increased in the conduit. The initial seal is made by the trailing cup edge expanding to firmly contact the conduit wall, after which the remainder of the cup expands into contact with the wall, and the tubular bladder subsequently expands as pressure is further increased, pressing the cable into frictional engagement with the conduit wall.

5 Claims, 2 Drawing Figures

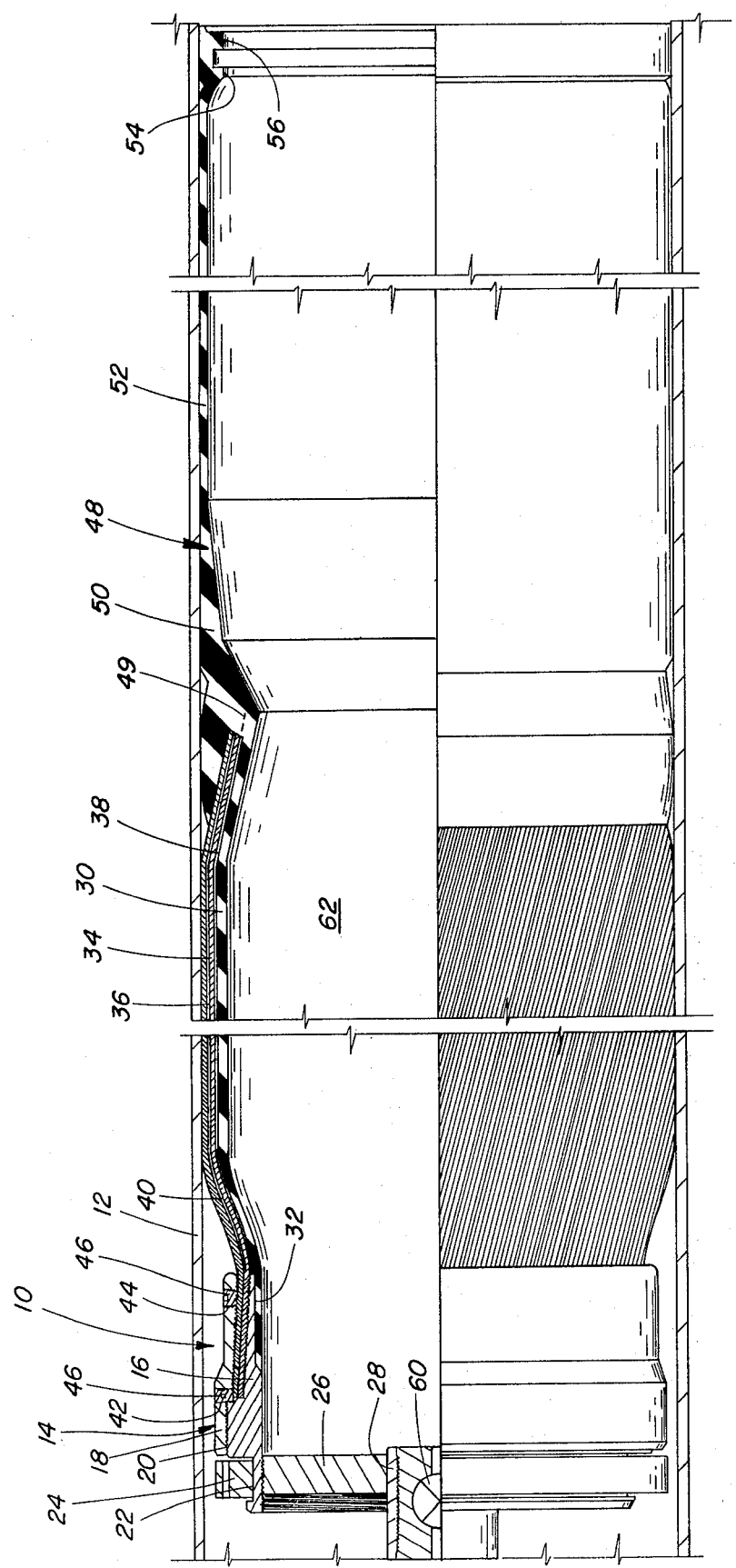

CUP TYPE PIPELINE INFLATION ANCHOR

BACKGROUND OF THE INVENTION

There are many occasions during the inspection and repair of pipelines when it is necessary to seal off the bore of the pipeline at a given location. For example, a pipeline may require sealing at a certain point in order to patch a leak or allow replacement of a section. In other instances, the pipeline bore may be sealed and the pressure raised behind the sealing device in order to ascertain if a leak exists in a particular pipeline section, the presence of such leak being indicated by a failure of the pipeline to hold pressure. Several prior art approaches have been taken in the design of such sealing devices.

U.S. Pat. No. 3,593,749 discloses a pipeline pig stopper which relies on mechanical grippers or slips to fix the pig in the pipeline bore, after which an inflatable element is expanded to effect the actual seal. Major disadvantages of such a device include the limitation of gripping power due to the relatively small size and rigid configuration of the grippers, and damage incurred by the interior of the pipe in which the grippers are set. These grippers may not conform exactly to the pipeline bore wall, which may be lined with relatively soft plastics. Such plastics can be easily damaged by the gripper serrations, particularly if the grippers are not perfectly aligned with the bore wall.

U.S. Pat. No. 3,762,446 discloses a pipeline leak locating and sealing apparatus employing an inflatable bladder. There is no anchor mechanism included in the device.

U.S. Pat. No. 3,903,728 discloses a pipeline pig employing the wedging action of a disc-shaped rigid plate against a resilient sealing cup to hold the device in place. The strength of the anchoring force is limited by the shear strength of the resilient cup material.

U.S. Pat. No. 3,978,678 discloses a pipeline plugging apparatus of relatively complex design which employs rigid gripping surfaces, generally referred to as "slips" in the art, to grip the pipeline walls. These slips require mechanical activation and may damage a pipeline lining.

U.S. Pat. No. 4,077,435 discloses a pipeline plugging apparatus which relies on stopping mechanisms inserted in the wall of the pipeline to arrest plug movement, subsequently sealing the pipeline bore with an expandable elastomer seal. While effective, the use of such stopping mechanisms necessarily limits the use of such plugs to instances where the pipeline is easily accessible and where a leak has already been located.

U.S. Pat. No. 4,079,755 discloses a rubber-covered inflatable pipeline plug reinforced with tire cord to withstand high inflation pressures. The utilization of an elastomer necessarily limits the anchoring force obtainable by the device, as the elastomer will tend to "creep" at high pipeline pressures, acting like a highly viscous fluid. Such "creep" is extremely undesirable, particularly when an exact pipeline location is desired for repair or leak location purposes.

In addition to the disadvantages noted above, the prior art devices also are extremely limited in their ability to traverse curves in a pipeline, unless they are made extremely short relative to their diameter, and a number of anchors or plugs employed in tandem. This is due in part to the limited expandability of the prior art devices, necessitating outer diameters which place the unset gripping or anchoring means close to the pipeline wall, and in part due to the fact that these devices are of a relatively constant diameter throughout their length.

Two other prior art devices disclosed in U.S. applications Ser. Nos. 309,621 and 309,645, assigned to Halliburton Company, employ highly flexible metallic anchoring elements such as woven or calendered steel cable for frictional engagement with conduit walls. While a marked improvement on the previously cited prior art, these devices require the use of inflatable bladders, with their attendant complex control mechanisms, unreliability in repeated use and the necessity for inflating and deflating the bladder with a hydraulic fluid each time the device is moved in the conduit.

Yet another prior art pipeline plug is disclosed in U.S. Pat. No. 3,835,889, wherein a rigid metal plug head encases a thick-walled trailing elastomeric cup-shaped casing having longitudinally extending metal ribs surrounding the outside thereof and attached to the plug head. As pressure is increased behind the cup (through use of valve mechanisms) the elastomer at the trailing end of the casing expands to create a seal and the ribs are pressed against the pipeline wall. The initial seal of the elastomeric casing is extremely weak due to the limited flexibility of the thick elastomer wall and to the extremely short effective sealing area available. Furthermore, the relatively rigid ribs result in possible slippage as pressure is increased after the initial elastomer/wall seal, as frictional resistance to plug slippage is not greatly enhanced until the metal ribs are engaged along their full longitudinal extent due to the lack of an anchoring effect in the initial elastomer/wall contact. Such slippage may also result in damage to the pipeline interior. Moreover, the large outer diameter of this device combined with the rigidity of the elastomeric casing/metal rib combination prevents traversal of acute bends on the pipeline and obstructions such as debris or welding residue.

SUMMARY OF THE INVENTION

In contrast to the prior art, the inflation anchor of the present invention comprises a simple, reliable, highly flexible apparatus for sealing off a pipeline or other conduit at a precise location, with the capability to hold the seal without slippage until such time as a single valve is opened or pressure behind the inflation anchor is relieved.

The inflation anchor of the present invention includes a single shoe assembly to which a tubular elastomeric element is bonded. The elastomeric element comprises a tubular bladder, which is attached to the shoe assembly at one of its ends, and a cup, which is cure-bonded to the bladder at its other end. The cup flares to a greater diameter than the bladder, and overlays one end of a double layer of calendered steel cable which is fixed to the shoe assembly at its other end, and surrounds and extends over most of the longitudinal extent of the bladder. When the inflation anchor is to be activated, a single valve is closed, preventing flow through the anchor resulting in a pressuring differential across the anchor. At this point, the trailing edge of the cup will seat and firmly seal against the conduit wall, the seal length and initial anchoring effect being increased as more of the cup is expanded with further pressure increases. After substantially the entire cup exterior contacts the conduit wall, the progressive nature of the anchor expansion results in an immediate engagement of the anchor against higher pressures as the calendered cable grips the conduit wall, the frictional holding force increasing as more of the cable grips the conduit wall.

BRIEF DESCRIPTION OF THE DRAWINGS

The present invention will be more readily understood by referring to the following detailed description of the preferred embodiment of the present invention, taken in conjunction with the accompanying drawings, wherein:

FIG. 2 is a horizontal half-section elevation of the inflation anchor shown in FIG. 1 fully inflated and anchored in the conduit.

DETAILED DESCRIPTION OF THE PREFERRED EMBODIMENT

Figure 1:
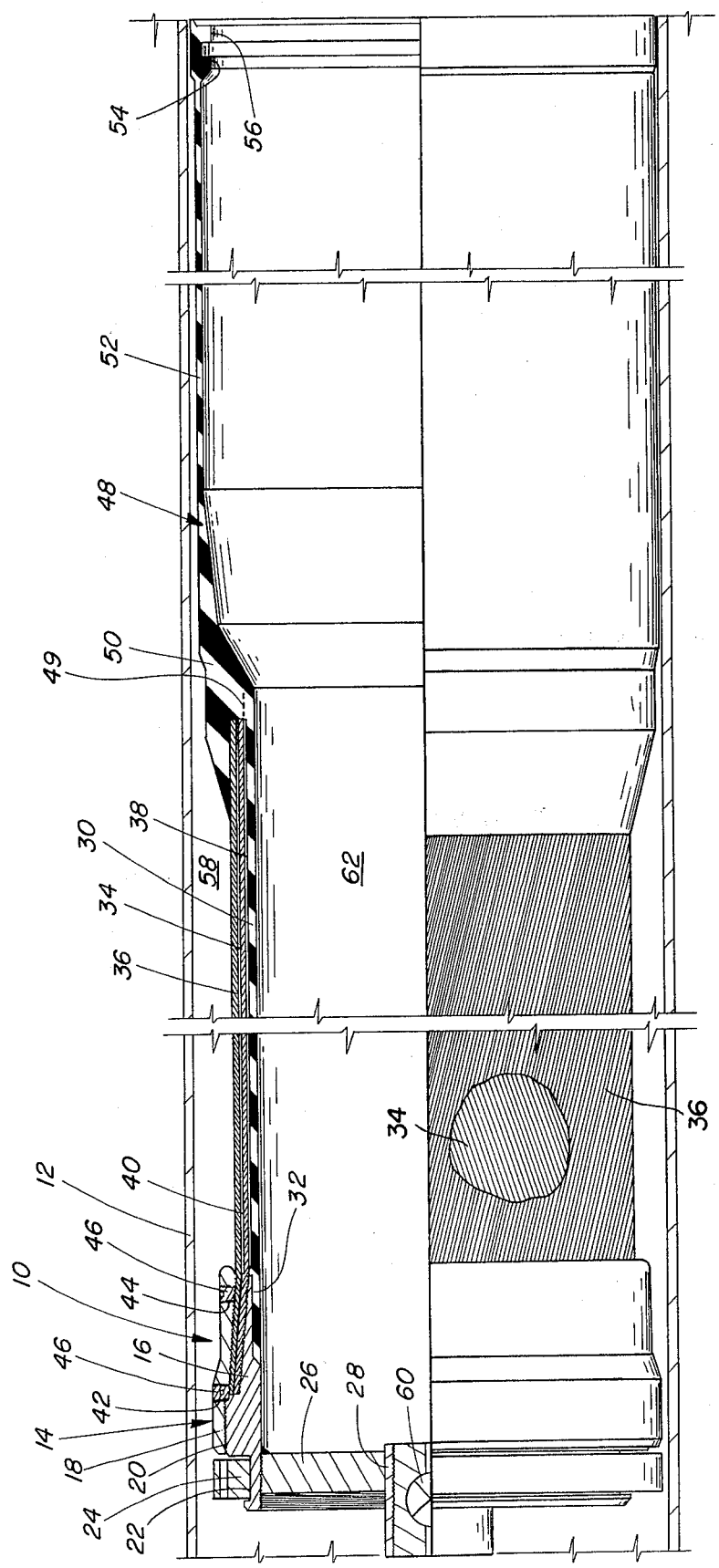
FIG. 1 is a horizontal half-section elevation of the inflation anchor of the present invention at its rests, uninflated, in a conduit.

Referring to FIG. 1, inflation anchor 10 of the present invention is depicted in a horizontal pipeline or other conduit 12. Inflation anchor 10 comprises shoe assembly 14, which in turn includes annular shoe base 16, which is surrounded by annular shoe wedge 18 threaded to shoe base 16 at annular shoulder 20. Scuff ring 24, preferably of polyurethane, surrounds shoe base 16 at undercut 22. Shoe assembly 14 further includes disc 26 having threaded adapter 28 therethrough, shoe base 16, disc 26 and adapter 28 being preferably welded together.

Tubular elastomeric bladder 30, preferably of natural rubber or polyurethane, is bonded to shoe base 16 at annular undercut 32. A double layer 34 and 36 of calendered cable, preferably 7×19 stainless aircraft cable, surrounds tubular bladder 30 substantially to its fullest longitudinal extent. The cable layers 34 and 36 are preferably laid on a 40° included angle, being a 20° opposite bias to the axis of inflation anchor 10 for each layer as depicted in the cutaway portion of the lower half of FIG. 1. Layers of natural rubber 38 and 40 are preferably interposed between tubular bladder 30 and cable layer 34, and between cable layer 34 and cable layer 36, respectively. The exterior of cable layer 36 is left exposed throughout most of its longitudinal extent.

The ends of cable layers 34 and 36 surrounding shoe base 16 are clamped between shoe base 16 and shoe wedge 18, any empty areas of the annular space between these portions of shoe assembly 14 being filled with epoxy resin through ports 42 about the circumference of shoe wedge 18. When the epoxy resin has filled the aforesaid annular space, it will extrude through a plurality of ports 44, ports 42 and 44 then being closed with pipe plugs 46.

Elastomeric cup 48, which extends from tubular bladder 30 to the end of inflation anchor 10, overlaps the free (unclamped) ends of cable layers 34 and 36 as well as the free end of tubular bladder 30. The cup 48 is bonded to bladder 30 as well as to cable layers 34 and 36 by the heat curing of the rubber elements. The bond line between bladder 30 and cup 48 is shown by broken line 49.

Cup 48 flares radially outward at area 50, which is of relatively thick wall diameter, after which the wall portion 52 continues the flare to a lesser degree, and becomes extremely thin relative to the cup diameter. The free end and trailing edge of cup 48 possesses annular ribs 54 and 56, the latter of which tapers outwardly to join the outer wall of the cup. The location of ribs 54 and 56 possesses a greater wall thickness than that of area 52, to lend reinforcement to the free end of the cup 48 and prevent cup 48 from collapsing when little or no pressure differential exists across inflation anchor 10.

OPERATION OF THE PREFERRED EMBODIMENT

The operation of inflation anchor 10 will now be described with reference to FIGS. 1 and 2 of the drawings. FIG. 1 shows inflation anchor 10 uninflated in a horizontal conduit. This is the normal mode in which inflation anchor 10 is "pumped" through a conduit by attachment at adapter 28 to a number of driving cups of substantially the same outer diameter as the inside diameter of the conduit. Such driving cups are known in the art, examples thereof being disclosed in the aforesaid U.S. Pat. No. 3,835,889, assigned to Halliburton Company, which is hereby incorporated by reference. The inflation anchor 10 is prevented from inflating by use of a relief valve, depicted schematically at 60, and is maintained in an open position to permit fluid passage between the exterior 58 and the center 62 of inflation anchor 10, thus equalizing pressures and preventing expansion of cup 48 against conduit 12. The opening and closing of the valve 60 may be controlled by a radio or electromagnetic signal receiver located within the center 62 of inflation anchor 10, through the action of an electric motor or solenoid, such devices being well known in the prior art.

When it is desired to plug the conduit for the purposes of ascertaining whether the conduit will hold pressure between the entry point of the inflation anchor and its location after movement in the conduit, a signal is sent by the operator and valve 60 is closed. Pressure is then applied to the fluid in the conduit, which acts upon the interior of cup 48, forcing the free end thereof outwardly against the wall of conduit 12. While a slight gap is shown in FIG. 1 between the free end of cup 48 and the wall of conduit 12, it should be understood that it is preferred that an interference fit exist between the two, so as to ensure substantially instantaneous sealing and initial anchoring of inflation anchor 10 upon closing of valve 60. Such expansion may occur at a relatively low pressure, below 50 PSI for example and not by way of limitation, due to the elastomeric characteristics of cup 48. As the pressure is increased, cup 48 expands further so that the exposed cable layer 36 contacts the conduit wall, providing exceptional frictional anchoring forces due to the multitudinous contact points achieved by the cable. This high degree of surface contact, in comparison to mechanical slips, lowers the compression and shear forces per square inch on the conduit wall, thus greatly lessening damage to any relatively soft conduit lining material, such as epoxy. In addition, the cable layers 34 and 36 provide reinforcement against the high fluid pressure (for example, 2500 PSI) in the conduit as well as accommodating the 300,000 pounds of tensile stress which may be generated against the body of the tool by the fluid pressure behind it.

Thus it is apparent that a self-setting inflation anchor has been disclosed which is simple and flexible yet rugged enough to withstand repeated inflations, and avoids the use of separate anchor and sealing mechanisms, complex valving, hydraulic lines and independent pressure sources (gas accumulators) such as are known in the prior art. The only controls needed for operation of inflation anchor 10 are valve 60 and pressure variations in the conduit fluid itself.

While the present invention has been described in terms of a preferred embodiment, it should be understood that many additions, deletions and modifications would be apparent to one of ordinary skill in the art. For example, the steel cable could be woven instead of calendered cable laid in layers. The scuff ring could be deleted and wheels substituted therefor. The rubber employed in the bladder and cup could be deleted and a polyurethane elastomer substituted therefor. These and other modifications may be made without departing from the spirit and scope of the claimed invention.

I claim:

1. An inflation anchor adapted to travel through the interior of a conduit in an uninflated state and to seal the bore thereof upon inflation, comprising:
    a shoe assembly including an annular shoe base, an annular shoe wedge threaded to said shoe base and a disc within said shoe base and fixed thereto;
    a thin tubular elastomeric bladder having a leading end and a trailing end, said leading end being bonded to the interior of said shoe base;
    at least two layers of calendered metal cable surrounding said tubular elastomeric bladder substantially to its fullest longitudinal extent, each layer of said metal cable having a leading end and a trailing end and being laid on a bias to the other layer and to the axis of said inflation anchor, both of said layers being clamped between said shoe base and said shoe wedge at their said leading ends; and
    an elastomeric cup overlapping said trailing ends of said bladder and said cable layers, said elastomeric cup being bonded to both, said elastomeric cup having a relatively thick annular wall proximate to and surrounding said bond, and a substantially thinner and flexible annular wall trailing therefrom, said thinner and flexible annular wall flaring outwardly to a trailing edge of relatively greater thickness which trailing edge possesses at least one reinforcing annular rib therein, said annular rib adapted to prevent collapse of said trailing edge of said thinner and flexible annular wall.

2. The apparatus of claim 1, wherein said elastomeric cup and bladder comprise natural rubber.

3. The apparatus of claim 2 further including a first thin layer of natural rubber between each of said cable layers, and a second thin layer of natural rubber between the innermost of said cable layers and said bladder.

4. The apparatus of claim 1 wherein said shoe base and said shoe wedge define an annular area therebetween, said annular area being filled with epoxy.

5. The apparatus of claim 1, further including a valve controlling a passage extending through said disc between the exterior and the interior of said inflation anchor.

* * * * *